United States Patent
Johnson et al.

(10) Patent No.: US 9,243,885 B2
(45) Date of Patent: Jan. 26, 2016

(54) MULTI-SPEED OCT SWEPT SOURCE WITH OPTIMIZED K-CLOCK

(71) Applicant: Axsun Technologies LLC, Billerica, MA (US)

(72) Inventors: Bartley C. Johnson, North Andover, MA (US); Brian Goldberg, Cambridge, MA (US); Dale C. Flanders, Lexington, MA (US)

(73) Assignee: Axsun Technologies, LLC, Billerica, MA (US)

( * ) Notice: Subject to any disclaimer, the term of this patent is extended or adjusted under 35 U.S.C. 154(b) by 48 days.

(21) Appl. No.: 13/650,665

(22) Filed: Oct. 12, 2012

(65) Prior Publication Data

US 2013/0271772 A1   Oct. 17, 2013

Related U.S. Application Data (60) Provisional application No. 61/623,396, filed on Apr. 12, 2012.

(51) Int. Cl.
G01B 9/02 (2006.01)

(52) U.S. Cl.
CPC ........ G01B 9/02004 (2013.01); G01B 9/02007 (2013.01); G01B 9/02069 (2013.01); G01B 9/02091 (2013.01)

(58) Field of Classification Search
CPC ........... G01B 9/02002; G01B 9/02007; G01B 9/02069; G01B 9/02091; G01B 9/02041; G01B 9/02048
USPC ................................. 356/479, 497
See application file for complete search history.

(56) References Cited

U.S. PATENT DOCUMENTS

| | | | |
|---|---|---|---|
| 7,061,618 B2 | 6/2006 | Atia et al. | |
| 7,415,049 B2 | 8/2008 | Flanders et al. | |
| 2008/0117427 A1* | 5/2008 | Teramura et al. | 356/484 |
| 2008/0165366 A1* | 7/2008 | Schmitt | 356/519 |
| 2008/0175465 A1 | 7/2008 | Jiang et al. | |
| 2009/0284749 A1* | 11/2009 | Johnson et al. | 356/497 |

(Continued)

FOREIGN PATENT DOCUMENTS

WO   2012/098194 A1   7/2012

OTHER PUBLICATIONS

Eigenwillig, C. M., et al., "Wavelength swept ASE source," Optical Coherence Tomography and Coherence Techniques IV, Proceedings of the SPIE, vol. 7372, 2009, pp. 73720O-1 to 73720O-6.

(Continued)

*Primary Examiner* — Kara E Geisel
*Assistant Examiner* — Dominic J Bologna
(74) *Attorney, Agent, or Firm* — HoustonHogle, LLP (57) ABSTRACT

An optical coherence tomography system utilizes an optical swept source that frequency scans at least two different sweep rates. In this way, the system can perform large depth scans of the sample and then the same system can perform shorter depth high precision scans, in one specific example. In order to optimally use the analog to digital converter that samples the interference signal, the system further samples the interference signals at different optical frequency sampling intervals depending upon the selected sweep rates of the optical swept source. This allows the system to adapt to different sweep rates in an optimal fashion.

29 Claims, 10 Drawing Sheets

(56) References Cited

U.S. PATENT DOCUMENTS

| | | | |
|---|---|---|---|
| 2009/0290167 A1* | 11/2009 | Flanders et al. | 356/497 |
| 2010/0110376 A1* | 5/2010 | Everett et al. | 351/206 |
| 2010/0142567 A1 | 6/2010 | Ward et al. | |
| 2010/0272432 A1* | 10/2010 | Johnson | 398/17 |
| 2011/0051143 A1 | 3/2011 | Flanders et al. | |
| 2011/0051148 A1 | 3/2011 | Flanders et al. | |
| 2011/0080591 A1* | 4/2011 | Johnson et al. | 356/479 |
| 2012/0162659 A1 | 6/2012 | Goldberg et al. | |

OTHER PUBLICATIONS

Huber, R., et al., "Fourier Domain Mode Locking (FDML): A new laser operating regime and applications for optical coherence tomography," Optical Society of America, Optics Express, vol. 14, No. 8, Apr. 17, 2006, pp. 3225-3237.

Xi, J., et al., "Generic real-time uniform K-space sampling method for high-speed swept-Source optical coherence tomography," Optics Express, vol. 18, No. 9, Apr. 26, 2010, pp. 9511-9517.

Yun, S. H., et al., "High-speed spectral-domain optical coherence tomography at 1.3 µm wavelength," Optical Society of America, Optics Express, vol. 11, No. 26, Dec. 29, 2003, pp. 3598-3604.

International Search Report and Written Opinion of the International Searching Authority dated Jul. 19, 2013, from counterpart International Application No. PCT/US2013/035544 filed on Apr. 8, 2013.

* cited by examiner

MULTI-SPEED OCT SWEPT SOURCE WITH OPTIMIZED K-CLOCK

RELATED APPLICATIONS

This application claims the benefit under 35 USC 119(e) of U.S. Provisional Application No. 61/623,396, filed on Apr. 12, 2012, which is incorporated herein by reference in its entirety.

BACKGROUND OF THE INVENTION

Optical coherence analysis relies on the use of the interference phenomena between a reference wave and an experimental wave or between two parts of an experimental wave to measure distances and thicknesses, and calculate indices of refraction of a sample. Optical Coherence Tomography (OCT) is one example technology that is used to perform high-resolution cross sectional imaging. It is often applied to imaging biological tissue structures, for example, on microscopic scales in real time. Optical waves are reflected from an object or sample and a computer produces images of cross sections or three-dimensional volume renderings of the sample by using information on how the waves are changed upon reflection.

There are several different classes of OCT, but Fourier domain OCT currently offers the best performance for many applications. Moreover, of the Fourier domain approaches, swept-source OCT has distinct advantages over techniques such as spectrum-encoded OCT because it has the capability of balanced and polarization diversity detection. It has advantages as well for imaging in wavelength regions where inexpensive and fast detector arrays, which are typically required for spectrum-encoded OCT, are not available.

In swept source OCT, the spectral components are not encoded by spatial separation, but they are encoded in time. The spectrum is either filtered or generated in successive optical frequency sampling intervals and reconstructed before Fourier-transformation. Using the frequency scanning swept source, the optical configuration becomes less complex but the critical performance characteristics now reside in the source and especially its frequency sweep rate and tuning accuracy.

High speed frequency tuning, or sweep rates, for OCT swept sources is especially relevant to in vivo imaging where fast imaging reduces motion-induced artifacts and reduces the length of the patient procedure. It can also be used to improve resolution.

The swept sources for OCT systems have typically been tunable lasers. The advantages of tunable lasers include high spectral brightness and relatively simple optical designs. A tunable laser is constructed from a gain medium, such as a semiconductor optical amplifier (SOA) that is located within a resonant cavity, and a tunable element such as a rotating grating, grating with a rotating mirror, or a Fabry-Perot tunable filter. Currently, some of the highest tuning speed/sweep rate lasers are based on the laser designs described in U.S. Pat. No. 7,415,049 B1, entitled Laser with Tilted Multi Spatial Mode Resonator Tuning Element, by D. Flanders, M. Kuznetsov and W. Atia. The use of micro-electro-mechanical system (MEMS) Fabry-Perot tunable filters combines the capability for wide spectral scan bands with the low mass, high mechanical resonant frequency deflectable MEMS membranes that have the capacity for high speed tuning/sweep rates. Another laser architecture is termed a Fourier-domain mode-locked laser (FDML). This type of laser stores light in a long length of fiber for amplification and recirculation in synchronism with the laser's tuning element. See "Fourier Domain Mode Locking (FDML): A new laser operating regime and applications for optical coherence tomography", R. Huber, M. Wojtkowski, and J. G. Fujimoto, 17 Apr. 2006/Vol. 14, No. 8/OPTICS EXPRESS 3225. The drawback of these devices is their complexity, however. Moreover, the ring cavity including the long storage fiber creates its own performance problems such as dispersion and instability.

Another class of swept sources that has the potential to avoid inherent drawbacks of tunable lasers is filtered amplified spontaneous emission (ASE) sources that combine a broadband light source, typically a source that generates light by ASE, with tunable filters and amplifiers.

Some of the highest speed devices based on filtered ASE sources are described in U.S. Pat. No. 7,061,618 B2, entitled Integrated Spectroscopy System, by W. Atia, D. Flanders P. Kotidis, and M. Kuznetsov, which describes spectroscopy engines for diffuse reflectance spectroscopy and other spectroscopic applications. A number of variants of the filtered ASE swept source are described, including amplified versions and versions with tracking filters.

More recently Eigenwillig, et al. have proposed a variant configuration of the filtered ASE source in an article entitled "Wavelength swept ASE source", Conference Title: Optical Coherence Tomography and Coherence Techniques IV, Munich, Germany, Proc. SPIE 7372, 73720O (Jul. 13, 2009). The article describes an SOA functioning both as an ASE source and first amplification stage. Two Fabry-Perot tunable filters are used in a primary-tracking filter arrangement, which are followed by a second SOA amplification stage. Also, U.S. patent application Ser. No. 12/553,295, filed on Sep. 3, 2009, entitled Filtered ASE Swept Source for OCT Medical Imaging, by D. Flanders, W. Atia, and M. Kuznetsov (U.S. Pat. Pub. No. US 2011/0051148 A1), which is incorporated herein in its entirety by this reference, lays out various integrated, high speed filtered ASE swept source configurations. U.S. patent application Ser. No. 12/776,373, filed on May 8, 2010, entitled ASE Swept Source with Self-Tracking Filter for OCT Medical Imaging, by the same inventors (U.S. Pat. Pub. No. US 2011/0051143 A1), outlines still further configurations that rely on the use of a self-tracking filter arrangement that can improve performance both in terms of sweep rate and linewidth, among other things, and which is also incorporated herein in its entirety by this reference.

In order to compensate for instabilities and/or non-linearities in the tuning of the OCT swept sources, a sampling clock (k-clock) is often employed to enable sampling at equally spaced increments in the optical frequency domain (k-space). This k-clock must usually be delayed to match the delay associated with the optical signals in the sample and reference arms of the interferometer of the OCT system.

If a k-clock is not used but the swept source tunes non-linearly, other corrective options are employed. Some resample the data equally in k-space by interpolation, see S. Yun, G. Tearney, B. Bouma, B. Park, and J. de Boer, "High-speed spectral-domain optical coherence tomography at 1.3 µm wavelength," Opt. Express 11, 3598-3604 (2003).

Resampling in k-space, however, has disadvantages. This is because another metric that characterizes the performance of OCT systems is the electronic bandwidth of the electronic signal processing systems. Sufficiently high bandwidth is becoming increasingly important as higher speed, performance and resolution OCT systems are produced. For example, increasing the wavelength tuning speed of the swept source, which produces higher OCT image acquisition speeds, also results in greater requirements for the electronics that are used to sample the resulting optical interference signals. Typically, to accurately resample, oversampling must be employed, which adds overhead to the electronic signal processing systems.

In newer designs, the k-clock system is integrated with the swept source. An example is disclosed in U.S. patent application Ser. No. 12/396,099, filed on Mar. 2, 2009, entitled Optical Coherence Tomography Laser with Integrated Clock, by Flanders, et al. (U.S. Pat. Pub. No. US 2009/0290167 A1), which is incorporated herein by this reference. Here, the delay in the k-clock is provided electronically. This solution has certain advantages in that the electronic delay can be programmable to match changes in the interferometer delay that might be concomitant with the use of different OCT probes, for example.

SUMMARY OF THE INVENTION

For some applications, it is desirable that the swept source have the capacity to provide different types of frequency scans. In one example, it is desirable to have a swept source that can do both scan with a high frequency or high sweep rate and at a low frequency or low sweep rate. This provides the capability to generate an image deep within a sample and then later perform a faster scan over a portion of that depth.

In a system that does not use a k-clock, but instead uses resampling, the challenge is simply to find a swept source that can scan at more than one sweep rate. Since resampling is used to address any non-linearity in the frequency scanning of the swept source, the different sweep rates of the source can be addressed when the image is rendered.

As noted previously, however, resampling is problematic because it requires oversampling of the interference signal. If the OCT system is constrained by the electronic bandwidth of the analog to digital converter that samples the interference signal, then systems that implement resampling will inherently have a lower performance than k-clock based swept sources, which do not have to oversample.

The problem with OCT systems that have multi-sweep rate swept sources and k-clock systems is that they have traditionally had difficulty adapting to different sweep rates in an optimal fashion. The k-clocks are configured to sample the interference signals at fixed optical frequency sampling intervals. As result, when moving to lower sweep rates, the analog to digital converters will be used suboptimally since they will sample the interference signals at the same optical frequency sampling intervals as when the higher sweep rates scans are used.

The present invention is directed to an optical coherence tomography system that on one hand utilizes an optical swept source that frequency scans at at least two different sweep rates. In this way, the system can perform large depth scans of the sample at low sweep rates and then the same system can perform fast shorter depth scans, in one specific example. In order to optimally use the analog to digital converter that samples the interference signal, the system further samples the interference signals at different optical frequency sampling intervals depending upon the selected sweep rates of the optical swept source.

In general, according to one aspect, the invention features an optical coherence tomography system. This system comprises an interferometer that divides a swept optical signal between a reference arm and a sample arm and combines optical signals returning from the reference arm and the sample arm to generate an interference signal, as is common. An optical swept source system is further provided that generates the swept optical signal, which is controlled to frequency scan at at least two different sweep rates.

In some embodiments, the swept source has only two sweep rates. In other embodiments, multiple sweep rates are used such as three, four, or five, or as many as ten or more.

In order to achieve optimal performance, the detection system detects the interference signal at different optical frequency sampling intervals depending on the sweep rates.

In order to further improve operation, and optimally use the analog to digital converter of the interference signal, a k-clock module is provided, in the preferred embodiment, that detects the frequency scanning of the swept optical signal and generates k-clock signals as the swept optical signal is scanned through intervals of optical frequency. In one example, the k-clock module comprises an etalon that filters the swept optical signal from the optical swept source system and a k-clock detector that detects the swept optical signal filtered by the etalon. In another example, the k-clock module comprises a k-clock interferometer that filters the swept optical signal from the optical swept source system and a k-clock detector that detects the swept optical signal filtered by the k-clock interferometer.

In one set of embodiments, the k-clock module generates multiple reference clock signals that would correspond to the optical frequency sampling intervals for different sweep rates of the swept source. A clock selector is then used for selecting among reference clock signals depending upon the sweep rate selected for the optical swept source system to generate the k-clock signals.

In another set of embodiments, the k-clock module comprises a k-clock multiplication module that multiples a frequency of the reference clock signals depending upon the sweep rate selected for the optical swept source system to generate the k-clock signals.

In more detail, this embodiment employs automatic configuration that automatically changes clock multiplier with sweep rate of the swept source. This is used so that the interference signal analog to digital converter that is used to sample interference signal still samples at approximately the same sampling rate regardless of the swept source sweep speed. That is, the samples per second taken by the interference signal analog to digital converter are approximately the same and preferably near its maximum sampling rate for each source sweep rate. As a result, for the slower sweep rates more samples typically are taken through the period of the sweep because of the clock multiplication. In summary, for the different source sweep speeds, the sampling rate as a function of time is approximately the same.

In one implementation, the k-clock multiplication module comprises a halfwave rectifier for rectifying the reference clock signals from the k-clock module prior (produces fundamental and even harmonics) to filtering by a bandpass filter. In another implementation, a clipping circuit produces fundamental and odd harmonics before bandpass filtering. In a third implementation, k-clock clock multiplication module comprises a fullwave rectifier in parallel with a clipping circuit to produce fundamental and all other clock harmonics prior to filtering by the bandpass filter.

In some applications, the higher scan or sweep rate mode will have a larger wavelength sweep (scan band) than for the lower scan or sweep rate. Alternatively, a scan band for a higher one of the scan or sweep rates is substantially the same as the scan band for the lower one of the scan sweep rates, for the optical swept source system. This allows tradeoffs between speed, maximum depth, and spatial resolution.

In some technologies, it is difficult to manufacture laser swept sources that have the capacity to operate well at different scan or sweep rates. Thus, in some embodiments, the optical swept source system comprises at least two laser swept sources that operate at different scan rates.

Other embodiments of the optical swept source system may comprise of one or more ASE swept sources that operate at different scan rates.

In general, according to another aspect, the invention features an optical coherence tomography method that comprises generating a swept optical signal and frequency scanning the swept optical signal at at least two different sweep rates and dividing the swept optical signal between a reference arm and a sample arm of an interferometer and combining optical signals returning from the reference arm and the sample arm to generate an interference signal. According to the invention, the interference signal is detected at different optical frequency sampling intervals depending on the sweep rates.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of the articles "a", "an" and "the" are intended to include the plural forms as well, unless expressly stated otherwise. It will be further understood that the terms such as includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element is referred to and/or shown as being connected or coupled to another element, it can be directly connected or coupled to the other element or intervening elements may be present.

It will be understood that although the terms first and second are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
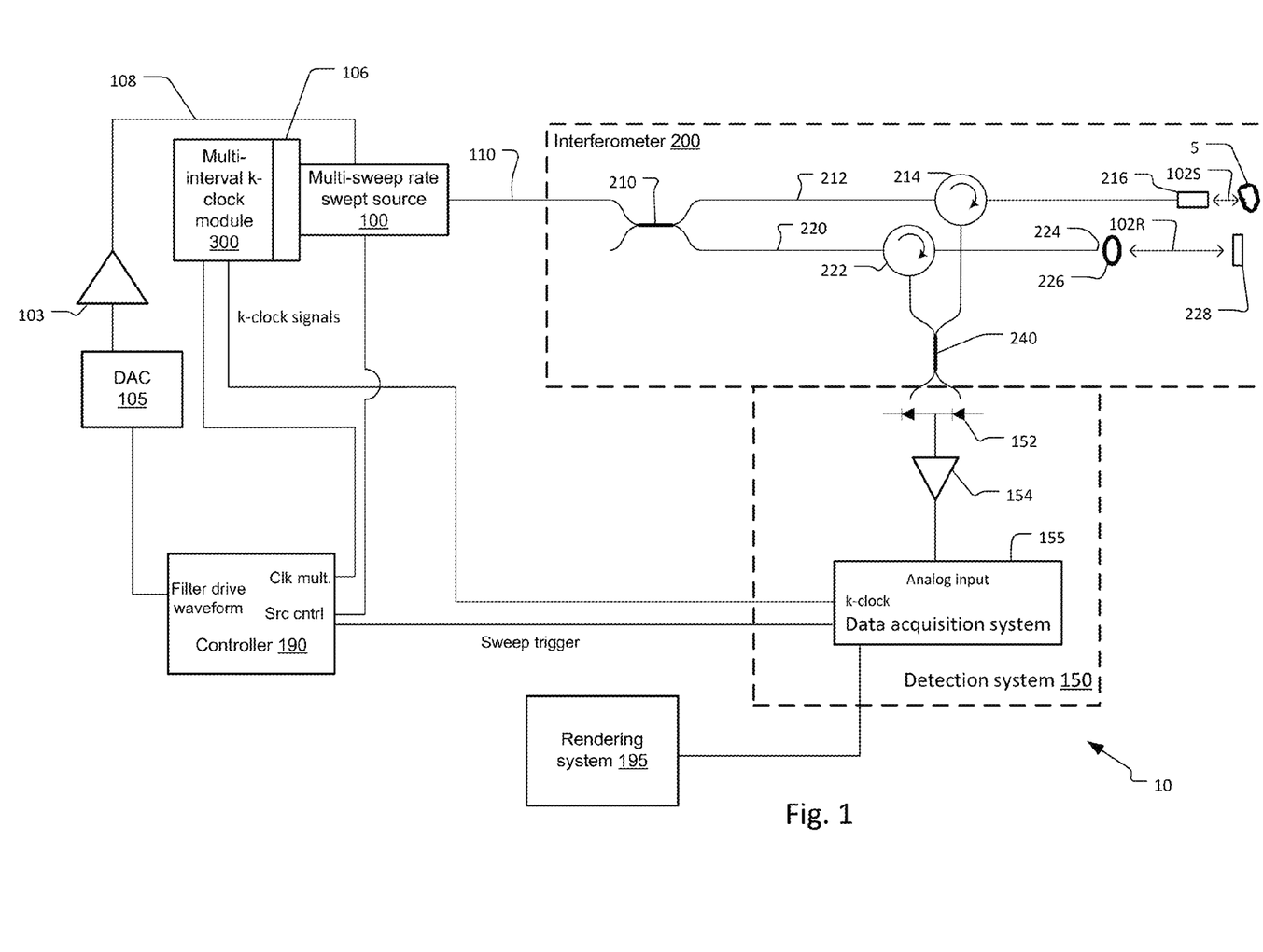
FIG. 1 is a schematic view of an OCT system incorporating the multi-sweep rate swept source according to the invention.

Turning now to the figures, FIG. 1 shows an optical coherence analysis system 10 using the multi-sweep rate swept source system 100, which has been constructed according to the principles of the present invention.

The multi-sweep rate swept source system 100 generates the tunable or swept optical signal on optical fiber 110 that is transmitted to interferometer 200. The swept optical signal scans over a scan band with a narrowband emission.

The multi-sweep rate swept source system 100 is generally intended for high speed tuning to generate swept optical signals that repeatedly scan over the scan band(s) at rates of greater than 1 kiloHertz (kHz). In current embodiments, the multi-sweep rate swept source system 100 tunes at speeds greater than 20 or 100 kHz. In very high speed embodiments, the multi-sweep rate swept source system 100 tunes at speeds greater than 200 or 500 kHz. On the other hand, the bandwidth of the narrowband emission has a full width half maximum (FWHM) bandwidth of less than 20 or 10 GigaHertz (GHz), and is preferably 5 GHz or less. For spectroscopy, this relatively narrow bandwidth yields high spectral resolution. For optical coherence tomography, this high spectral resolution implies a long coherence length of the source and therefore enables imaging deeper into samples, for example deeper than 5 millimeters (mm). In lower performance applications, for example OCT imaging less than 1 mm deep into samples, broader FWHM bandwidths are sometimes appropriate, such as bandwidths of about 200 GHz or less.

Typically, the width of the tuning or scan band is greater than 10 nanometers (nm). In the current embodiments, it is preferably between 50 and 150 nm, although even wider tuning bands are contemplated in some examples.

A controller 190 generates a drive waveform that is supplied to a digital to analog converter 105. This generates a tunable optical element drive signal 107 that is amplified by amplifier 103 and applied to the multi-sweep rate swept source 100. In one example, the controller stores a number of filter drive waveforms that correspond to different sweep rates for one or more tunable optical filters, such as Fabry-Perot tunable filters, contained in the swept source system 100. In some of these embodiments, the wavelength scan bands are also different for the different sweep rate scans of the swept source system 100.

The controller 190 further controls the multi-sweep rate swept source 100 using a source control signal that is used to reconfigure the swept source system 100 for different sweep rates and scans over different scan bands.

A multi-interval k-clock module 300 is used to generate k-clock signals at equally spaced optical frequency sampling intervals as the swept optical signal is tuned or swept over the scan or tuning band. A swept source signal coupler 106 is used to provide a portion of the swept source signal to the multi-interval k-clock module 300. In the following embodiments, the coupler 106 is implemented in fiber. Certainly in alternative embodiments, integrated and/or free space systems could be used.

In the current embodiment, a Mach-Zehnder-type interferometer 200 is used to analyze the optical signals from the sample 5. The swept optical signal from the swept optical source system 100 is transmitted on fiber 110 to a 90/10 optical fiber coupler 210. The swept optical signal is divided by the coupler 210 between a reference arm 220 and a sample arm 212 of the system.

The optical fiber of the reference arm 220 terminates at the fiber endface 224. The light 102R exiting from the reference arm fiber endface 224 is collimated by a lens 226 and then reflected by a mirror 228 to return back, in some exemplary implementations.

The external mirror 228 has an adjustable fiber to mirror distance, in one example. This distance determines the depth range being imaged, i.e. the position in the sample 5 of the zero path length difference between the reference arm 220 and the sample arm 212. The distance is adjusted for different sampling probes and/or imaged samples. Light returning from the reference mirror 228 is returned to a reference arm circulator 222 and directed to a 50/50 fiber coupler 240.

The fiber on the sample arm 212 terminates at the sample arm probe 216. The exiting swept optical signal 102S is focused by the probe 216 onto the sample 5. Light returning from the sample 5 is returned to a sample arm circulator 214 and directed to the 50/50 fiber coupler 240.

The reference arm signal and the sample arm signal are combined in the fiber coupler 240 to generate an interference signal.

The interference signal is detected a detection system 150. Specifically, a balanced receiver, comprising two detectors 152, is located at each of the outputs of the fiber coupler 240. The electronic interference signal from the balanced receiver 152 is amplified by amplifier 154.

A data acquisition system 155 of the detection system 150 is used to sample the interference signal output from the amplifier 154. The k-clock signals derived from the k-clock module 300 are used by the data acquisition system 155 to synchronize system data acquisition with the frequency tuning of the optical swept source system 100.

Once a complete data set has been collected of the sample 5 by spatially raster scanning the focused probe beam point over the sample, in a Cartesian geometry, x-y, fashion or a cylindrical geometry theta-z fashion, and the spectral response at each one of these points is generated from the frequency tuning of the optical swept source system 100, the rendering system 195 performs a Fourier transform on the data in order to reconstruct the image and perform a 2D or 3D tomographic reconstruction of the sample 5. This information generated by the rendering system 195 can then be displayed on a video monitor.

In one application, the probe 216 is inserted into blood vessels and used to scan the inner wall of arteries and veins. In other examples, other analysis modalities are included in the probe such as intravascular ultrasound (IVUS), forward looking IVUS (FLIVUS), high-intensity focused ultrasound (HIFU), pressure sensing wires and image guided therapeutic devices. In still other applications, the probe is used to scan different portions of an eye or tooth or other structure of a patient or animal.

According to the invention, the multi-sweep rate swept source system 100 scans the sample 5 with swept source signals that are scanned at different sweep rates. Additionally, different wavelength scan bands are used in some examples with these different sweep rates.

Figure 2A:
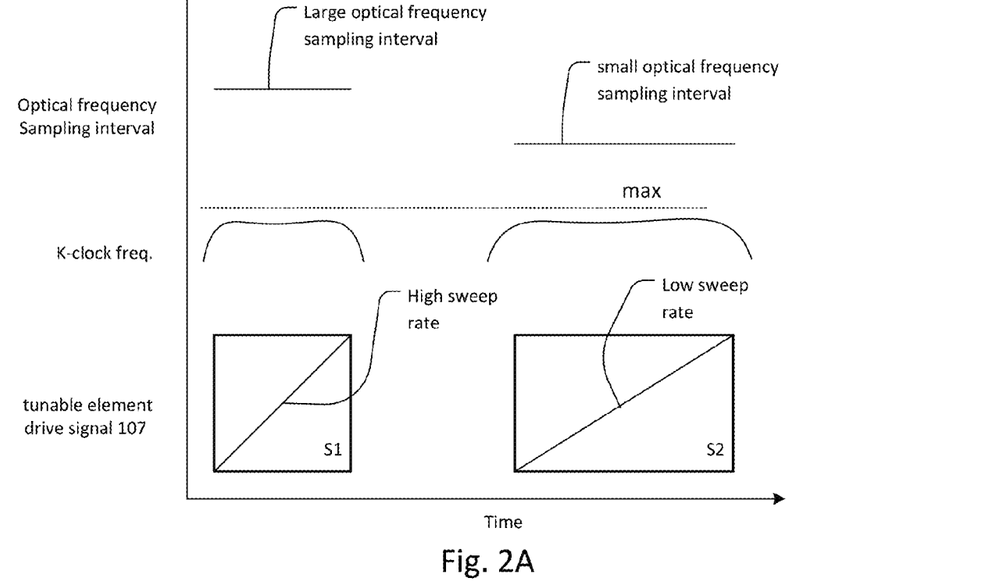
FIG. 2A are schematic plots showing the frequency scanning of the swept optical signal (tunable element drive signal), the frequency of the k-clock signal during the frequency scanning, and the optical frequency sampling interval as a function of time for two different sweep rates of the optical swept source, in which for both sweep rates, the scan band is the same or substantially the same, but a longer scan in time is used for the slower sweep rate scan of the swept optical signal.

FIG. 2A shows the frequency scanning of the swept optical signal for two different scans at two different sweep rates. For example, the first scan S1 has a high sweep rate. That is, the tunable element drive signal 107 applied to the optical swept source generates a high sweep rate as indicated by the slope over the period of the scan S1. In contrast, the second scan S2 is a low sweep rate scan in which the optical frequency of the optical swept source changes more slowly as a function of time over the period of the scan S2.

For both scans S1 and S2, the frequency of the k-clock signals that are generated by the multi-interval k-clock module 300 and used to clock the digital acquisition system 155 is substantially the same. As a result, this k-clock frequency can be selected to be near the maximum frequency limit of the digital acquisition system 155. More importantly, and relevant to the preferred embodiment, the k-clock frequency is almost the same or the same as k-clock frequency that is used in the low sweep rate scan as the high sweep rate scan.

In order to maintain the high k-clock frequency irrespective of the sweep rate of the swept optical signal, the optical frequency sampling interval changes depending on the sweep rate. For example, in the high sweep rate scan S1 of the swept optical signal, a relatively large optical frequency sampling interval is used compared to a smaller optical frequency sampling interval that is used during the low sweep rate scan S2. In turn, this means that S2 will have a deeper spatial scan depth range, but S1 and S2 will have the same axial spatial resolution.

Figure 2B:
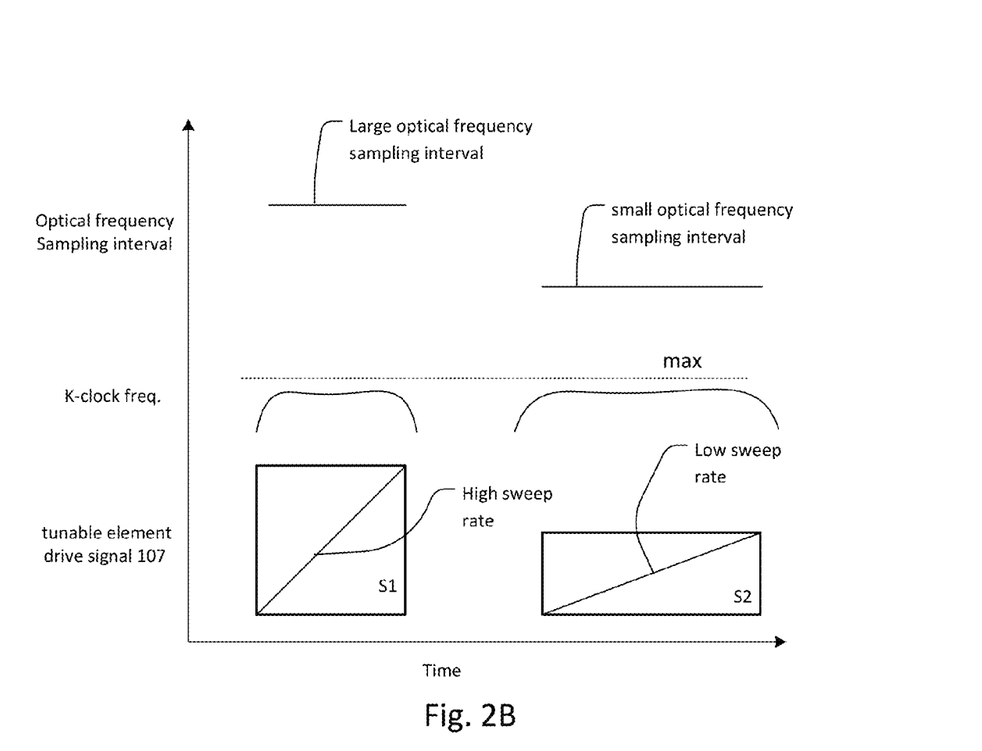
FIG. 2B are schematic plots showing the frequency scanning of the swept optical signal (tunable element drive signal), the frequency of the k-clock signal during the frequency scanning, and the optical frequency sampling interval as a function of time for two different sweep rates of the optical swept source, in which the scan band is smaller for the lower sweep rate scan and a longer scan in time is used for the slower sweep rate scan of the swept optical signal.

FIG. 2B shows the frequency scanning of the swept optical signal for two further scans at two different sweep rates and different wavelength scan band. For example, the first scan S1 has a high sweep rate over a large optical frequency scan band as indicated by the slope or rate of change of the tunable element drive signal 107. In contrast, the second scan S2 is a low sweep rate scan over a smaller optical frequency scan band in which the optical frequency of the optical swept source changes more slowly as a function of time over the period of the scan S2 as indicated by the slope or rate of change of the tunable element drive signal 107. In this case, S2 will have a deeper spatial scan depth range and a lower resolution than S1.

Again, for both scans S1 and S2, the frequency of the k-clock signals that are generated by the multi-interval k-clock module 300 and used to trigger (clock) the digital acquisition system 155 is substantially the same. In order to maintain the high k-clock frequency irrespective of the sweep rate of the swept optical signal, the optical frequency sampling interval changes depending on the sweep rate. For example, in the high sweep rate scan S1 of the swept optical signal, a relatively large optical frequency sampling interval is used compared to a smaller optical frequency sampling interval that is used during the low sweep rate scan S2.

Figure 3:
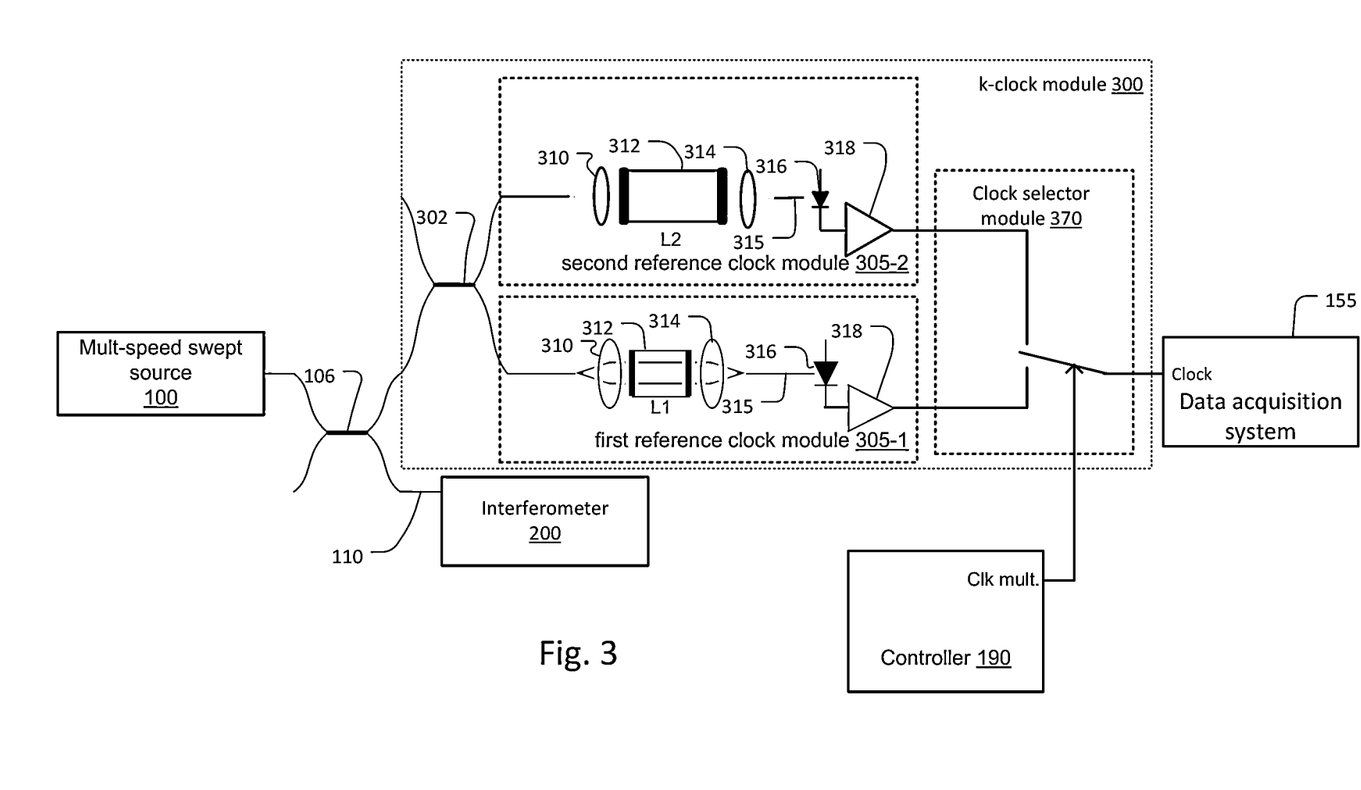
FIG. 3 is a block diagram showing a multi-interval K-clock module using etalons that generates multiple reference clock signals and then uses a clock selector module that is controlled based upon the sweep rate of the optical swept source system.

FIG. 3 shows an embodiment of the multi-interval k-clock module 300. In more detail, the swept optical signal that is generated by the multi-speed swept source 100 is divided with one portion propagating on optical fiber 110 to the interferometer 200 by swept source signal coupler 106, which is an optical fiber coupler. The other portion is directed to a k-clock module optical coupler 302 that divides the swept optical signal between a first reference clock module 305-1 and a second reference clock module 305-1 of the multi-interval k-clock module 300.

Each of the first reference clock module 305-1 and the second reference clock module 305-2 comprises a first lens 310 that collimates the swept optical signal from the k-clock fiber coupler 302. The swept optical signal is then coupled into an etalon 312. Generally, an etalon comprises an optically transmissive substrate in which each end has a mirror coating. It is thus transmissive at fixed optical frequency intervals.

The light exiting from the etalon 312 is focused by a second lens 314 and coupled into an optical fiber 315. The light exiting from that optical fiber pigtail 315 is then detected by a detector 316. The electrical signal detected by the detector 316 is amplified by an amplifier 318 and provided to a clock selector module 370.

Reference clock module 305-1 and the second reference clock module 305-2 are used to generate two reference clock signals that have equal optical frequency sampling intervals. Specifically, the first reference clock module 305-1 is used for high sweep rate optical frequency scans of the optical swept source system whereas the second reference clock module 305-2 is used for low sweep rate optical frequency scans of the optical swept source system 100. To achieve this, the optical length L2 of the etalon 312 for the second reference clock module 305-2 is shorter to provide smaller optical frequency sampling intervals than the length L1 for first reference clock module 305-1.

The controller 190 controls the clock selector module 370 to select the reference clock signal produced by the first reference clock module 305-1 when it controls the swept optical source system 100 to implement a high sweep rate scan of the swept optical signal. In contrast, the controller 190 controls the clock selector module 370 to select the reference clock signal from the second reference clock module 305-2 when it controls the optical swept source system 100 to implement a low sweep rate scan of the swept optical signal.

Figure 4:
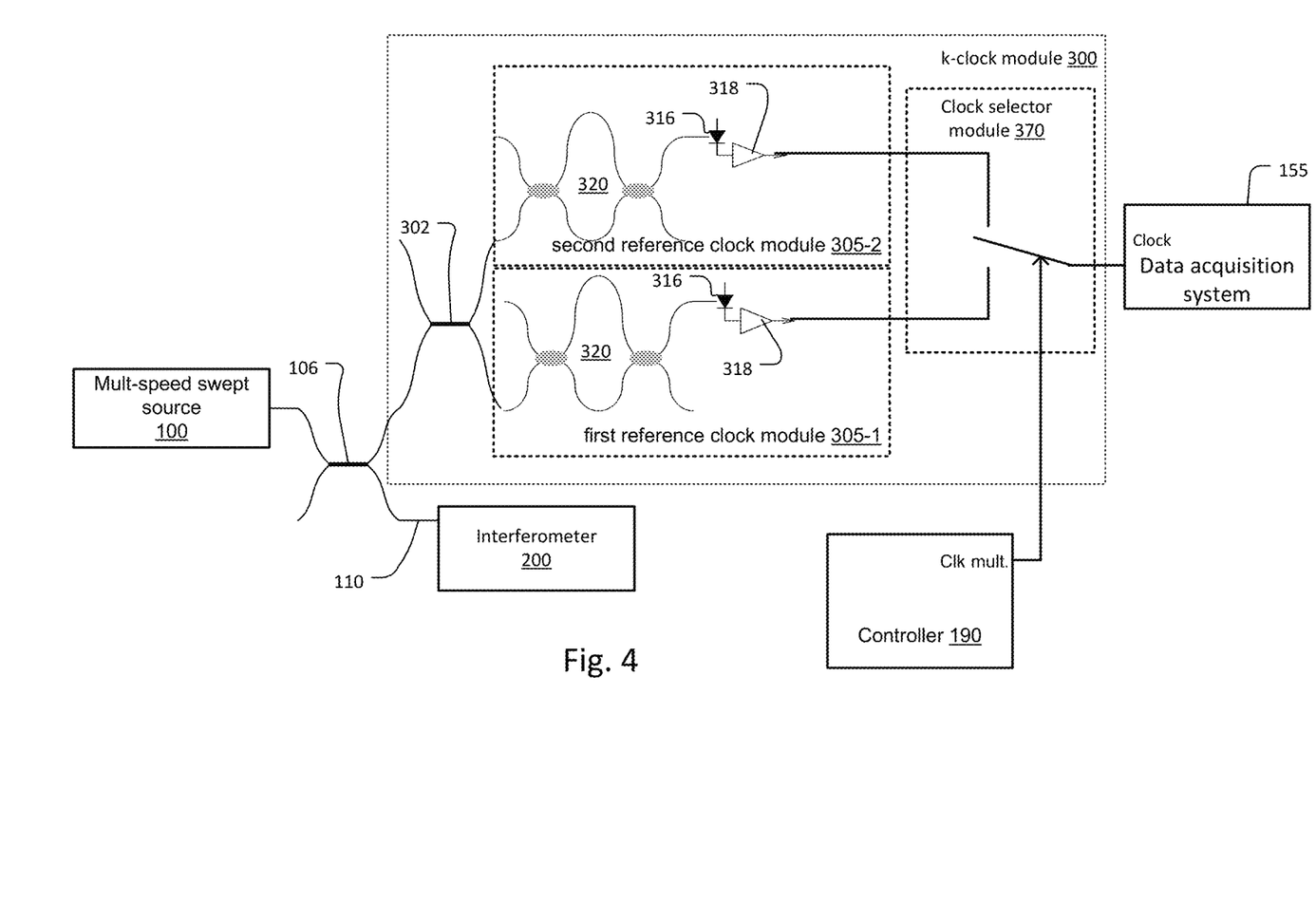
FIG. 4 is a block diagram showing a multi-interval K-clock module using fiber interferometers that generates multiple reference clock signals and then uses a clock selector module that is controlled based upon the sweep rate of the optical swept source system.

FIG. 4 shows another embodiment of the multi-interval K-clock module 300. In more detail, the swept optical signal that is generated by the multi-speed swept source 100 is again divided with one portion propagating on optical fiber 110 to the interferometer 200 by an optical fiber coupler 106. The other portion is directed to the k-clock module optical coupler 302 that divides the swept optical signal between the first reference clock module 305-1 and the second reference clock 305-2.

Each of the first reference clock module 305-1 and the second reference clock module 305-2 comprises reference clock fiber interferometer 320 that functions as an optical filter that is optically transmissive at fixed optical frequency intervals. In each of the reference clock modules 305, the output of the fiber interferometer 320 is detected by a reference clock module detector 316 and amplified by an amplifier 318.

The first reference clock module 305-1 and the second reference clock module 305-2 are used to generate two reference clock signals that have different frequencies. Specifically, the first reference clock module 305-1 is used for high sweep rate optical frequency scans of the optical swept source system whereas the second reference clock module 305-2 is used for low sweep rate optical frequency scans of the optical swept source system 100. To achieve this, the fiber interferometers 320 of each of the modules are configured to provide different optical frequency filtering intervals. The optical path difference of the interferometer 320 for the second reference clock module 305-2 is longer to provide smaller optical frequency sampling intervals than the interferometer path difference for first reference clock module 305-1.

The controller 190 controls the clock selector module 370 to select the reference clock signal produced by the first reference clock module 305-1 when it controls the swept optical source system 100 to implement a high sweep rate scan of the swept optical signal. In contrast, the controller 190 controls the clock selector module 370 to select the reference clock signals from the second reference clock module 305-2 when it controls the optical swept source system to implement a low sweep rate frequency scan of the swept optical signal.

Figure 5:
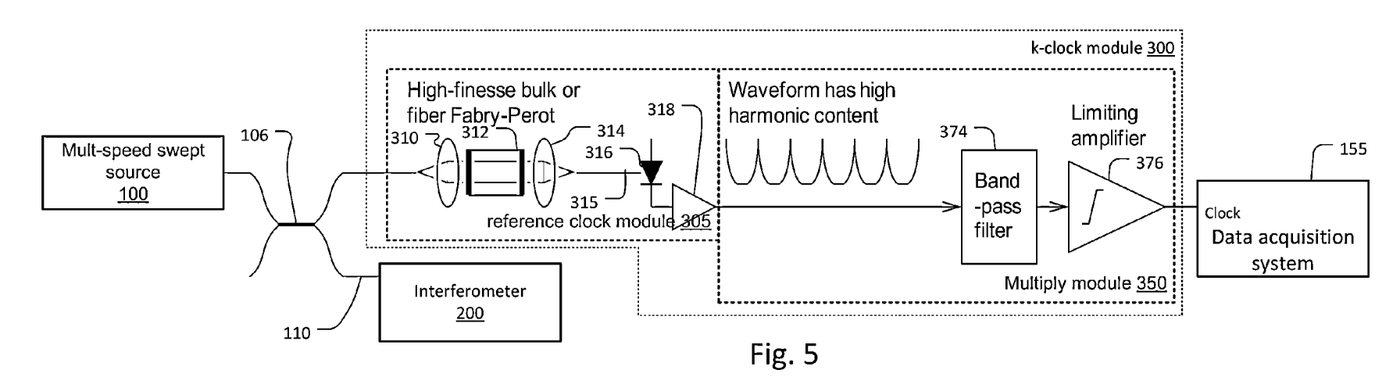
FIG. 5 is a block diagram showing a multi-interval K-clock module using an etalon that generates a reference clock signal that is then filtered to generate the k-clock signal that changes automatically with the sweep rate of the optical swept source system.

FIG. 5 shows still a different embodiment of the K-clock module 300. In this embodiment, a clock selector module 370 is not required. Instead, K-clock module 350 functions as a multiplier that multiplies the reference clock signals in order to automatically produce the desired K-clock signals. Specifically, a bandpass filter 374 functions to select the proper harmonic of the reference clock signal that is produced by a reference clock module.

In more detail, the swept optical signal is filtered by a reference clock module 305 as described previously. The specific embodiment illustrated combines a first lens 310, an etalon 312, a second lens 314, an optical fiber pigtail 315, an optical signal detector 316 and an amplifier 318. The module 305 could also function with direct free-space coupling into the detector 316.

The filtering performed by the etalon 312 yields a waveform that has a high harmonic content as illustrated by the timeseries plot inset in the figure, which is generally characteristic of a high finesse etalon. A bandpass filter of a k-clock multiplication module then bandpass filters this signal to select the desired harmonic. This is then passed through a limiting amplifier 176 to produce the K-clock signals.

In the preferred mode of operation, the controller 190 controls the multi-speed swept source 100 to divide its optical sweep rate (in GHz/ns) by a whole number multiple, such as 2, 3, 4, 5 . . . . When the sweep rate is changed, the frequency of the reference clock signals produced by the reference clock module 305 is also reduced by a similar multiple. Nevertheless, the waveform that is produced at the output of the amplifier 318 has the high harmonic content. Since the passband of the bandpass filter 374 is fixed, the reduction in the sweep rate of the swept source 100 does not have a concomitant decrease in the frequency of the K-clock signals that are produced by k-clock module 300. Instead, the bandpass filter 374 simply functions to select a harmonic of the reference clock signals as the new K-clock. In summary, this embodiment functions to act as an automatic reference clock multiplier. This multiplication results in the automatic changing of the optical frequency sampling intervals in dependence upon the sweep rates.

Figure 6:
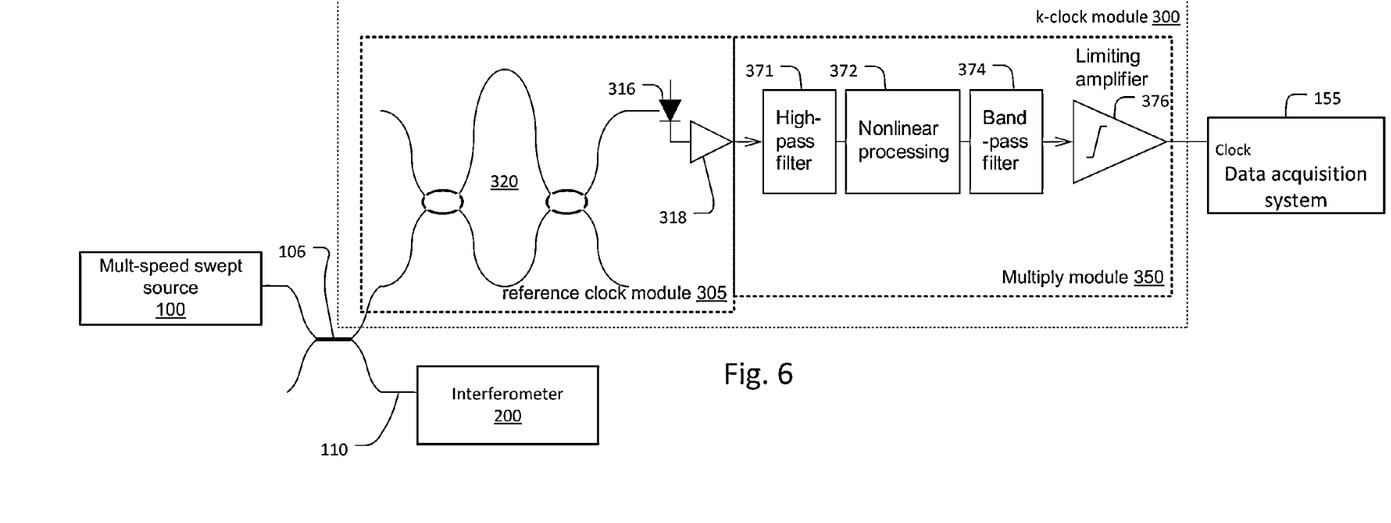
FIG. 6 is a block diagram showing a multi-interval K-clock module using an fiber interferometer that generates a reference clock signal that is then filtered to generate the k-clock signal that changes automatically with the sweep rate of the optical swept source system.

FIG. 6 shows an alternative embodiment that used in which the reference clock module 305 comprises a fiber interferometer 320.

The fiber interferometer 320 produces a generally sinusoidal output that is high pass filtered by a high pass filter 371 to remove interference below the interferometer signal frequency in the k-clock multiplication module 350. A nonlinear processing module 372 then performs non-linear filtering to produce a signal with a high harmonic content. A bandpass filter 374 then selects the desired harmonic, which is passed through a limiting amplifier 376 that is used to select the proper harmonic as the k-clock signals for the digital acquisition system 155.

Figure 7:
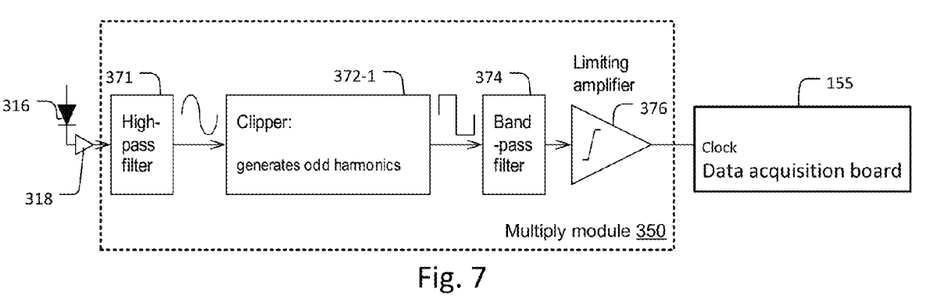
FIG. 7 is a block diagram showing another implementation of the non-linear processing module using a clipper that enables the generation of the k-clock signal that changes with the sweep rate of the optical swept source system.

FIG. 7 illustrates the operation of one of these nonlinear-processing modules within the k-clock multiplication module 350. In general, this embodiment can be used with either an etalon-based or an interferometer-based reference clock module 305. In the following description, however, it is assumed that the reference clock signals produced by the reference clock module 305 are generally sinusoidal, as is characteristic of an interferometer or a low finesse etalon.

Again, the k-clock multiplication module 350 comprises a high pass filter 371 that filters the reference clock signals from the reference clock module 305. Depending upon whether an etalon or an interferometer is used, a sinusoidal or Airy function output is produced. This signal is then passed through a clipper non-linear processing module 372-1. This produces a generally square wave output that is then filtered by the bandpass filter 374. A limiting amplifier 376 then produces the k-clock signals that are used by the digital acquisition system 155.

Figure 8A:
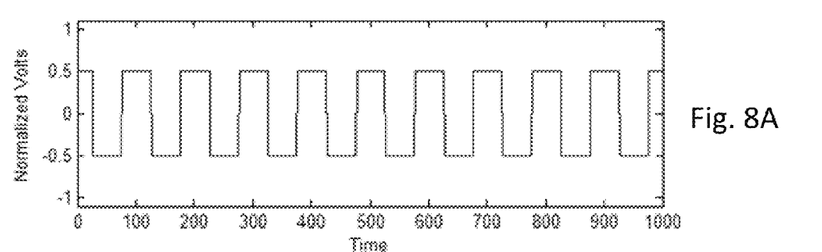
FIG. 8A is a schematic plot of Volts as a function of time showing the effect of the clipper non-linear processing module.
Figure 8B:
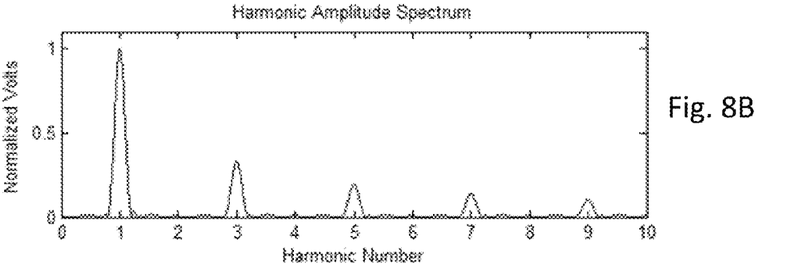
FIG. 8B is schematic plot of Volts as a function of harmonic number showing the spectral composition of the output of the clipper non-linear processing module.

FIG. 8A illustrates the output of the clipper module 372-1. It is generally a square wave function that is produced by clipping a sinusoid. The harmonic content of the output of the clipper is illustrated in FIG. 8B. Generally, it has high harmonic content at the odd harmonics of the baseband frequency of the square wave illustrated in FIG. 8A. As a result, this embodiment typically works best when the sweep rate of the multi-speed sweep (in GHz/ns) is controlled to be reduced by an odd integer divisor.

Figure 9:
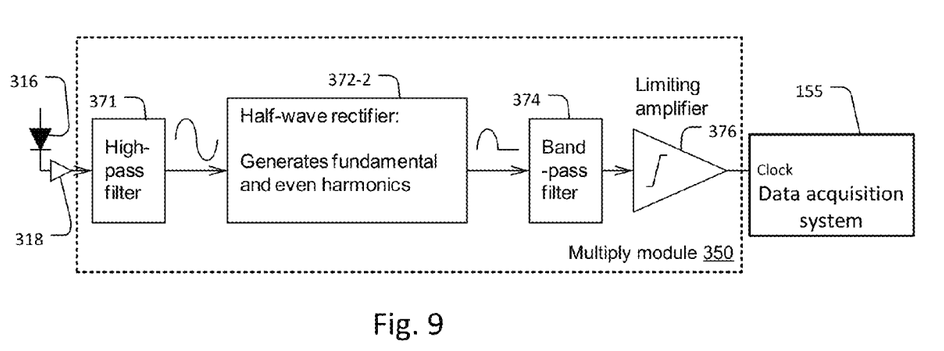
FIG. 9 is a block diagram showing another implementation of the non-linear processing module using a half-wave rectifier that enables the generation of the k-clock signal that changes automatically with the sweep rate of the optical swept source system.

FIG. 9 illustrates the operation of another embodiment of the nonlinear-processing module within the k-clock multiplication module 350.

The k-clock multiplication module 350 comprises a high pass filter that filters the reference clock signals from the reference clock module 305. This signal is then passed through a half wave rectifier non-linear processing module 372-2. This is then filtered by the bandpass filter 374. A limiting amplifier 376 then produces the k-clock signals that are used by the digital acquisition system 155.

Figure 10A:
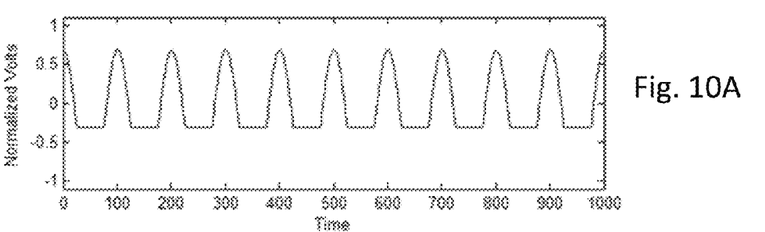
FIG. 10A is a schematic plot of Volts as a function of time showing the effect of the half-wave rectifier non-linear processing module.
Figure 10B:
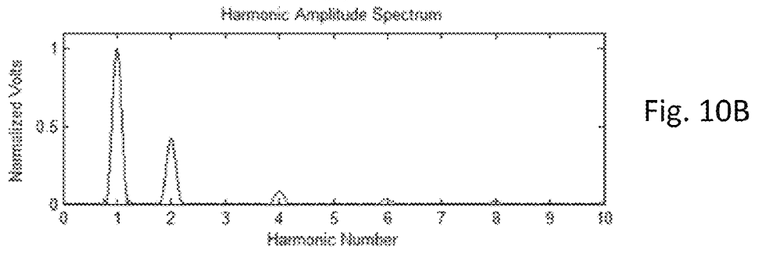
FIG. 10B is a schematic plot of Volts as a function of harmonic number showing the spectral composition of the output of the half-wave rectifier non-linear processing module.

FIG. 10A illustrates the output of the half wave rectifier non-linear processing module 372-2. It is generally a rectified sinusoid. The harmonic content of the output of the half wave rectifier non-linear processing module 372-2 is illustrated in FIG. 10B. Generally, it has harmonic content at the first second and fourth harmonics of the baseband frequency of the waveform illustrated in FIG. 10A.

Figure 11:
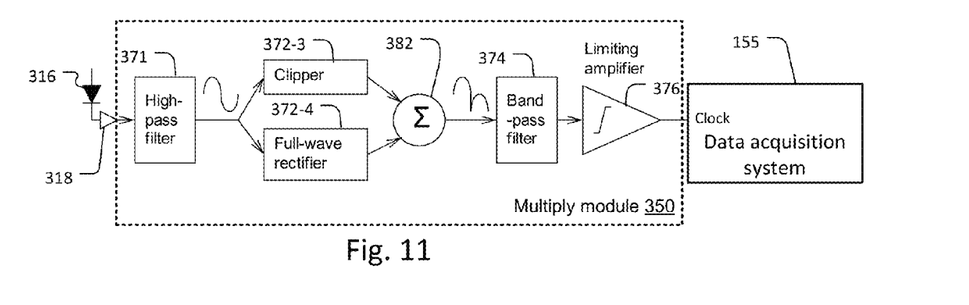
FIG. 11 is a block diagram showing another implementation of the non-linear processing module using a clipper and full-wave rectifier that enables the generation of the k-clock signal that changes automatically with the sweep rate of the optical swept source system.

FIG. 11 illustrates the operation of still another embodiment of the nonlinear-processing module within the k-clock multiplication module 350.

The k-clock multiplication module 350 comprises a high pass filter 371 that filters the reference clock signals from the reference clock module 305. This signal is then passed to a parallel connected clipper 372-3 and a full wave rectifier non-linear processing module 372-4. The outputs of the clipper 372-3 and the full wave rectifier 372-4 are then combined in a summing circuit 382. The output of the summing circuit 382 is then filtered by the bandpass filter 374. A limiting amplifier 376 then produces the k-clock signals that are used by the digital acquisition system 155.

Figure 12A:
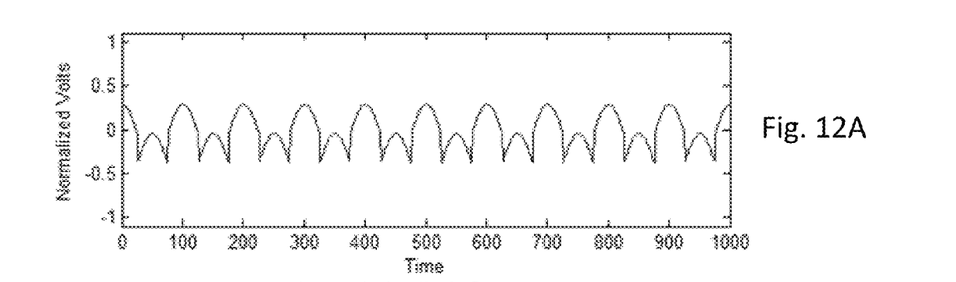
FIG. 12A is a schematic plot of Volts as a function of time showing the effect of the clipper and full-wave rectifier non-linear processing module.
Figure 12B:
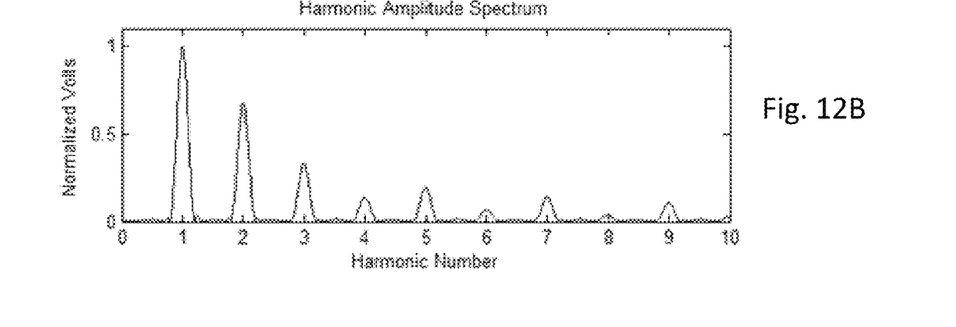
FIG. 12B is a schematic plot of Volts as a function of harmonic number showing the spectral composition of the output of the clipper and full-wave rectifier non-linear processing module.

FIG. 12A illustrates the output of the summing circuit 382. It is generally similar to a full wave rectified sinusoid. The harmonic content is illustrated in FIG. 12B. Generally, it has harmonic content at most of the harmonics.

Figure 13A:
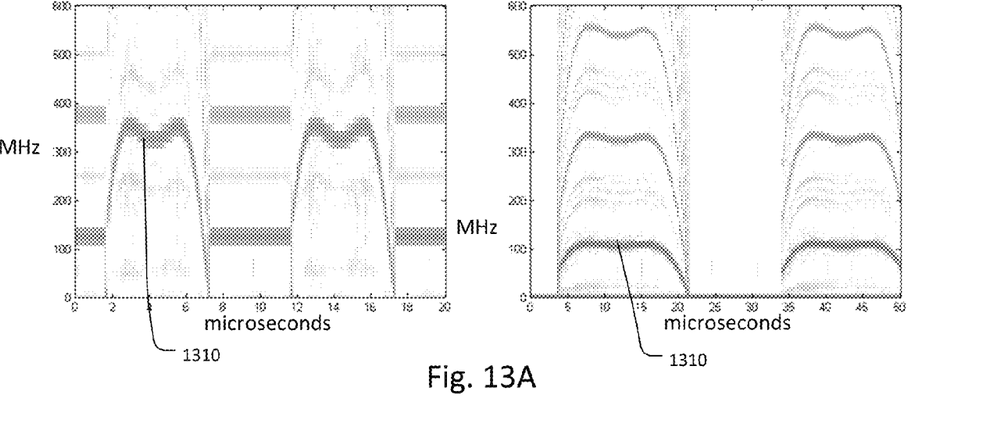
FIG. 13A are experimental plots of frequency as a function of time showing the spectral composition of the reference clock signal for a low sweep rate scan of the optical swept source system and a high sweep rate scan, the low sweep rate (right) is ⅓ the high sweep rate (left)

FIG. 13A illustrates the operation k-clock modules 300 that use the reference clock multiplying modules 350 such as the embodiment illustrated in FIG. 7. In more detail, when the swept optical signal is generated with a high sweep rate, as illustrated in the lefthand plot, the multi-interval K-clock module 300 produces k-clock signals at the desired frequency, which in the illustrated example is approximately 350 MHz. These are used to control the sampling of the digital acquisition system 155.

The plot on the right shows the clock signals that are produced by the multiplying module 350 when the sweep rate of the swept optical signal is reduced by approximately ⅓. The baseband frequency of the reference clock signals 1310 is shown at approximately 100 MHz. Harmonics are present, at about 300 MHz and approximately 600 MHz.

Figure 13B:
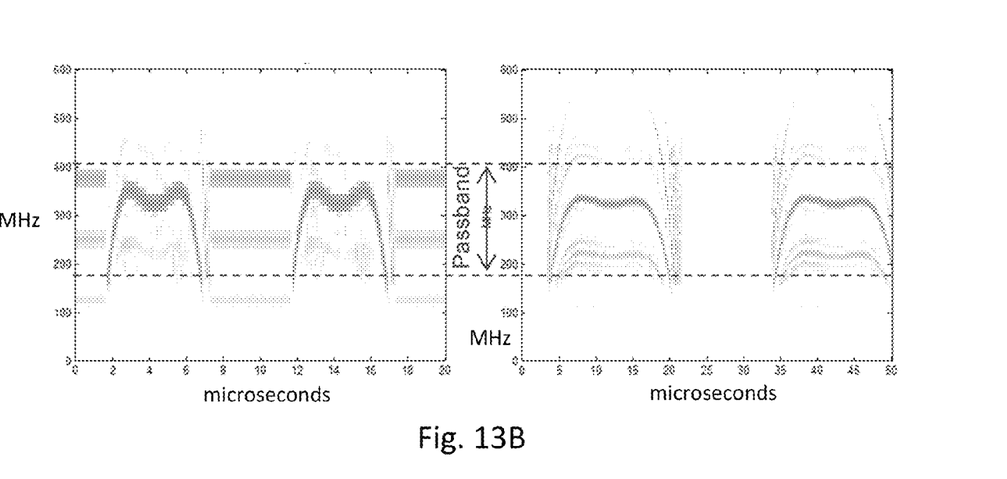
FIG. 13B are experimental plots of frequency as a function of time showing operation of the bandpass filter to generate the K-clock signals from the reference clock signals for a low sweep rate scan of the optical swept source system and a high sweep rate scan in which the bandpass filter selects the fundamental clock frequency for the fast sweep (left) and the third harmonic of the slow sweep clock (right)

FIG. 13B shows the operation of the bandpass filter 374 in the reference clock multiplying module 350. The passband of the bandpass filter 374 allows the baseband reference clock signals to be transmitted through as the k-clock signals during high sweep rate operation illustrated in the left hand plot. In contrast, at the slow sweep rate operation illustrated on the right hand plot, the third harmonic of the baseband of the reference clock signals is passed as the k-clock signals. In this way, the combination of the reference clock module and the reference clock multiplication module 350 function to automatically generate a k-clock signal that is a harmonic of the reference clock signals when a slower sweep rate of the swept optical signal is selected.

Figure 14A:
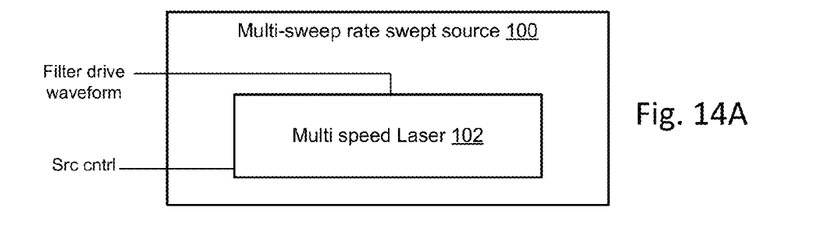
FIGS. 14A-14D illustrate different implementations of the optical swept source system using lasers and/or ASE swept sources.

FIG. 14A shows one implementation of the multi-sweep rate swept source 100. In this example, a single multi-speed laser 102 is used. This is a laser that is capable of sweeping at both a high sweep rate and a low sweep rate and possibly five or more different rates. The filter drive waveform signal 108 from the DAC 105 is used to control an intracavity tunable element such as a filter or grating. In one specific example, this drive signal is used to control a MEMS Fabry Perot tunable filter as used in the cavity of the laser as described in incorporated U.S. Pat. No. 7,415,049.

Figure 14B:
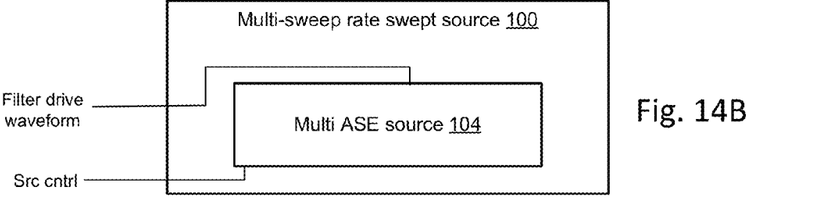

FIG. 14B shows another embodiment of the multi-sweep rate swept source 100. In this example, a multi-speed ASE swept source 104 is used. Here the filter drive waveform signal 108 from the DAC 105 is used to control one or more tunable elements that filters the output of an ASE source such as disclosed in incorporated in US Pat. Appl. Publ. Nos. US 2011/0051148 A1 or US 2011/0051143 A1, in specific implementations.

Often, however, with some technologies, it is not possible, or at least difficult, to produce lasers that can operate at different sweep rates.

Figure 14C:
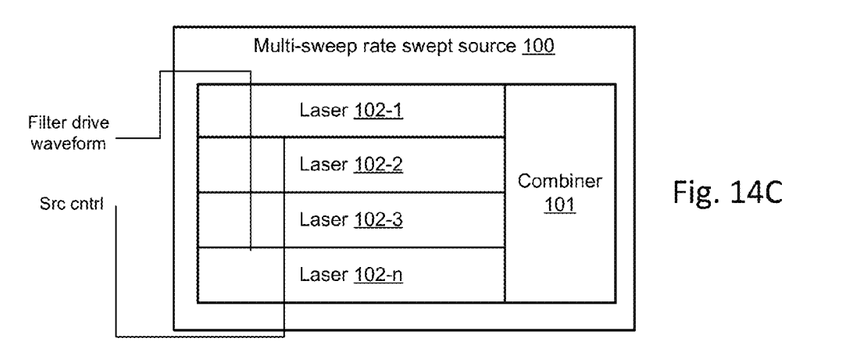

FIG. 14C shows another embodiment of the multi-sweep rate swept source 100. In this embodiment, multiple lasers, such as four or more lasers 102-1, 102-2, 102-3, 1-102-n, are used. Each of these lasers is optimized for a different sweep rate. These lasers are selectively activated by the controller 190 via the source control (src cntrl) line. A combiner 101 or optical switch combines or switches (under the control of the source control signal) the output of the lasers so that the swept optical signal from the laser currently selected for the desired sweep rate is transmitted to the multi-interval K-clock module 300 and the OCT interferometer 200.

Figure 14D:
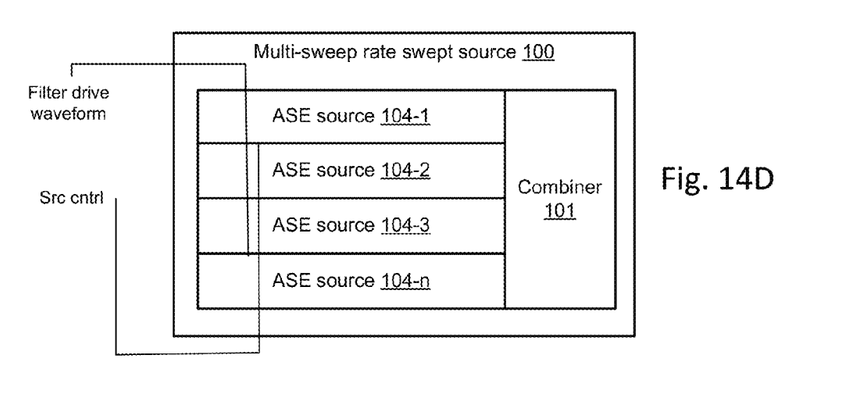

FIG. 14D shows another embodiment of the multi-sweep rate swept source 100. In this embodiment, multiple ASE sources, such as four or more sources 104-1, 104-2, 104-3, 104-n, are used. Each of these sources is optimized for a different sweep rate.

While this invention has been particularly shown and described with references to preferred embodiments thereof, it will be understood by those skilled in the art that various changes in form and details may be made therein without departing from the scope of the invention encompassed by the appended claims.

What is claimed is:

1. A k-clock module for an optical coherence tomography system that detects the frequency scanning of the swept optical signal from an optical swept source system and generates k-clock signals as the swept optical signal is scanned through intervals of optical frequency, comprising:
    at least two optical filters that filter the swept optical signal from the optical swept source system;
    k-clock detectors that detect the swept optical signal filtered by the least two optical filters to generate reference clock signals; and
    a clock selector for selecting among reference clock signals depending upon a sweep rate selected for the optical swept source system to generate the k-clock signals.

2. A system as claimed in claim 1, wherein the optical filters include etalons.

3. A system as claimed in claim 1, wherein the optical filters include interferometers.

4. A k-clock module for an optical coherence tomography system that detects the frequency scanning of the swept optical signal from an optical swept source system and generates k-clock signals as the swept optical signal is scanned through intervals of optical frequency, comprising:
    an optical filter that filters the swept optical signal from the optical swept source system;
    a k-clock detector that detects the swept optical signal filtered by the optical filter to generate a reference clock signal; and
    a k-clock multiplication module that multiples a frequency of reference clock signal to generate the k-clock signals depending upon a sweep rate selected for the optical swept source system.

5. A k-clock module as claimed in claim 4, wherein the k-clock multiplication module comprises a rectifier for rectifying the reference clock signals from the k-clock module prior to filtering by a bandpass filter.

6. A k-clock module as claimed in claim 4, wherein the k-clock multiplication module comprises a fullwave rectifier for rectifying the clock signals from the k-clock module prior to filtering by a bandpass filter.

7. An optical coherence tomography system, comprising:
    an interferometer that divides a swept optical signal between a reference arm and a sample arm and combines optical signals returning from the reference arm and the sample arm to generate an interference signal;
    an optical swept source system that generates the swept optical signal, which is controlled to frequency scan at at least two different sweep rates;
    a k-clock module that detects the frequency scanning of the swept optical signal and generates k-clock signals; and
    a detection system that detects the interference signal at different optical frequency sampling intervals depending on the sweep rates by reference to the k-clock signals.

8. An optical coherence tomography system as claimed in claim 7, further comprising wherein the k-clock module generates the k-clock signals as the swept optical signal is scanned through intervals of optical frequency.

9. An optical coherence tomography system as claimed in claim 7, wherein the k-clock module generates the k-clock signals as the swept optical signal is scanned through fixed intervals of optical frequency.

10. An optical coherence tomography system as claimed in claim 9, wherein the k-clock module comprises an etalon that filters the swept optical signal from the optical swept source system and a k-clock detector that detects the swept optical signal filtered by the etalon.

11. An optical coherence tomography system as claimed in claim 9, wherein the k-clock module comprises a k-clock interferometer that filters the swept optical signal from the optical swept source system and a k-clock detector that detects the swept optical signal filtered by the k-clock interferometer.

12. An optical coherence tomography system as claimed in claim 9, wherein the k-clock module generates reference clock signals and comprises a clock selector for selecting among reference clock signals depending upon the sweep rate selected for the optical swept source system to generate the k-clock signals.

13. An optical coherence tomography system as claimed in claim 9, wherein the k-clock module comprises a k-clock multiplication module that multiples a frequency of reference clock signals depending upon the sweep rate selected for the optical swept source system to generate the k-clock signals.

14. An optical coherence tomography system as claimed in claim 13, wherein k-clock multiplication module comprises a rectifier for rectifying the reference clock signals from the k-clock module prior to filtering by a bandpass filter.

15. An optical coherence tomography system as claimed in claim 12, wherein k-clock clock multiplication module comprises a fullwave rectifier for rectifying the clock signals from the k-clock module prior to filtering by a bandpass filter.

16. An optical coherence tomography system as claimed in claim 7, wherein for a higher one of the scan rates, the scan band is smaller than for lower one of the scan rates, for the optical swept source system.

17. An optical coherence tomography system as claimed in claim 7, wherein a scan band for a higher one of the scan rates is substantially the same as the scan band for the lower one of the scan rates, for the optical swept source system.

18. An optical coherence tomography system as claimed in claim 7, wherein the optical swept source system comprises at least two laser swept sources that operate at different scan rates.

19. An optical coherence tomography system as claimed in claim 7, wherein the optical swept source system comprises at least two ASE swept sources that operate at different scan rates.

20. An optical coherence tomography system as claimed in claim 7, wherein the detection system comprises a balanced detector that detects the interference signal and a data acquisition system for analog to digital converting the balanced detector signal.

21. An optical coherence tomography method, comprising:
generating a swept optical signal and frequency scanning the swept optical signal at at least two different sweep rates;
dividing the swept optical signal between a reference arm and a sample arm of an interferometer and combining optical signals returning from the reference arm and the sample arm to generate an interference signal;
generating k-clock signals from the swept optical signal; and
detecting the interference signal in response to the k-clock signals at different optical frequency sampling intervals depending on the sweep rates.

22. An optical coherence tomography method as claimed in claim 21, wherein the k-clock signals are generated as the swept optical signal is scanned through intervals of optical frequency.

23. An optical coherence tomography method as claimed in claim 21, wherein the k-clock signals are generated as the swept optical signal is scanned through fixed intervals of optical frequency.

24. An optical coherence tomography method as claimed in claim 23, wherein detecting the frequency scanning comprises filtering the swept optical signals with an etalon.

25. An optical coherence tomography method as claimed in claim 23, wherein detecting the frequency scanning comprises filtering the swept optical signals with a k-clock interferometer.

26. An optical coherence tomography method as claimed in claim 23, further comprising generating reference clock signals and selecting among the reference clock signals depending upon the sweep rate selected for the optical swept source system to generate the k-clock signals.

27. An optical coherence tomography method as claimed in claim 21, further comprising:
detecting the frequency scanning of the swept optical signal;
generating reference clock signals as the swept optical signal is scanned through fixed intervals of optical frequency;
multiplying a frequency of the reference clock signals depending upon the sweep rate selected for the optical swept source system to generate k-clock signals; and
using the k-clock signals to control the detection of the interference signal.

28. An optical coherence tomography method as claimed in claim 27, wherein multiplying the frequency of the reference clock signals comprises rectifying the reference clock signals prior to bandpass filtering.

29. An optical coherence tomography method as claimed in claim 21, wherein for a higher one of the scan rates, the scan band is smaller than for lower one of the scan rates.

* * * * *